(12) United States Patent
Tiao

(10) Patent No.: US 7,225,506 B2
(45) Date of Patent: Jun. 5, 2007

(54) HINGE STRUCTURE FOR MOUNTING A COVER ONTO AN ELECTRONIC DEVICE

(75) Inventor: Jung-Mao Tiao, Hsi Chih (TW)

(73) Assignee: Benq Corporation, Kewishan Taoyuan (TW)

( * ) Notice: Subject to any disclaimer, the term of this patent is extended or adjusted under 35 U.S.C. 154(b) by 291 days.

(21) Appl. No.: 10/844,696

(22) Filed: May 13, 2004

(65) Prior Publication Data
US 2004/0228082 A1 Nov. 18, 2004

(30) Foreign Application Priority Data
May 14, 2003 (TW) ................. 92113059 A

(51) Int. Cl.
*E05D 7/12* (2006.01)
*H05K 5/00* (2006.01)

(52) U.S. Cl. ................ 16/374; 16/332; 361/681; 361/683; 355/75

(58) Field of Classification Search ........... 16/332, 16/374, 375, 377, 306, 296, 284, 285, 239, 16/342; 399/377, 379, 380, 211; 220/810, 220/827, 829, 848, 845; 358/497, 474, 471, 358/487; 250/239, 234; 361/681, 683; 355/75
See application file for complete search history.

(56) References Cited

U.S. PATENT DOCUMENTS

| | | | | |
|---|---|---|---|---|
| 2,114,644 A * | 4/1938 | Bennett | ............ | 126/194 |
| 2,546,590 A * | 3/1951 | Ferrel | ............ | 16/302 |
| 4,787,121 A * | 11/1988 | Racenis et al. | ............ | 16/356 |
| 5,126,787 A * | 6/1992 | Irie et al. | ............ | 355/75 |
| 6,163,927 A * | 12/2000 | Leu | ............ | 16/272 |
| 6,806,944 B2 * | 10/2004 | Votipka et al. | ............ | 355/75 |
| 6,835,891 B1 * | 12/2004 | Herzog et al. | ............ | 174/66 |
| 2002/0061212 A1 * | 5/2002 | Tanaka | ............ | 399/379 |

FOREIGN PATENT DOCUMENTS

| | | | |
|---|---|---|---|
| JP | 08244311 A | * | 9/1996 |
| JP | 11-205548 | | 7/1999 |
| JP | 2006046616 A | * | 2/2006 |

OTHER PUBLICATIONS

Patents Abstracts of Japan of JP 11-205548 dated Jul. 30, 1999.

* cited by examiner

*Primary Examiner*—Robert J. Sandy
*Assistant Examiner*—Andre' L. Jackson
(74) *Attorney, Agent, or Firm*—Ladas and Parry LLP

(57) ABSTRACT

A scanner uses a hinge to connect the cover and the scanner body. The scanner further comprises a brake apparatus and a force-dispersing mechanism. The brake apparatus interferes the lifting cover at a predetermined interfering angle for avoiding the cover to thump at the scanning surface. The force-dispersing mechanism is used to disperse a stress resulted from the cover is lifted to be over a predetermined safety angle with respect to the scanning surface of the scanner.

17 Claims, 8 Drawing Sheets

HINGE STRUCTURE FOR MOUNTING A COVER ONTO AN ELECTRONIC DEVICE

FIELD OF THE INVENTION

The present invention relates to a hinge, and more particularly to the hinge that connects pivotally a scanner and a cover.

BACKGROUND OF THE INVENTION

Recently, with the advent of multimedia, digital image data can be seen everywhere. In order to digitize an image, various kinds of image-capturing devices were introduced to the market, such as digital cameras, digital video recorders, surveillance equipments, scanners . . . etc. Among all, the scanner plays a very important role in capturing plane images.

Refer now to FIG. 1a and FIG. 1b, in which FIG. 1a shows a conventional scanner 2 and FIG. 1b is a cross-sectional view of the scanner 2 of FIG. 1a. The scanner 2 is composed of a scanner body 4 including components such as an image capturer, an image processor, mechanisms . . . etc. (not shown in the image). The image capturer captures a plan image of an object posited upon the scanner body 4 through light scanning. For providing a standard environmental sensitivity, a cover 6 is posited upon the scanner body 4 to cover the object. In order to open or close the cover 6 more quickly and accurately over a scanning surface 10 of scanner body 4, a hinge 8 is located on a side of the cover 6. Through the hinge 8 pivotal shaft, the cover 6 can joint pivotally the scanner body 4.

In the prior art, when a user opens the cover 6 within a lifting angle less than 90 degree between the cover 6 and scanner body 4, the user must hold the cover 6 manually to avoid the cover 6 dropping back to the scanning surface 10. Once the lifting angle is over 90 degree, the user then needn't to hold the cover 6 anymore. However, at this moment, if the scanner 2 is further moved or accidentally shaken, the cover 6 may be disturbed and fall automatically back to hit at the scanning surface 10. Definitely, under such an incident, damage can be foreseen.

Besides, if the cover 6 is opened further after the 90-degree angle is achieved, the hinge 8 will hit a dead point at a predetermined angle to prevent the cover 6 from being over turned. This predetermined angle is usually called a safety angle. Nevertheless, while the cover 6 is opened to the safety angle and, at this point, only a little portion of the hinge 8 is used to contact with the cover 6, any abrupt action from the user onto the cover 6 will quite possible damage the hinge 9. In the dark side, such a damage at the hinge 8 may wreck the scanner 2.

Hence, to provide a brake apparatus or a force-dispersing mechanism to the hinge for resolving the problem mentioned above is definitely worthy in the art.

SUMMARY OF THE INVENTION

It is an object of the invention to provide a brake apparatus to an electron device for preventing a cover of the electronic device to impact against a particular body surface of the electronic device incidentally.

Another object of the invention is to provide a force-dispersing mechanism for dispersing the force between the hinge and the cover so as to avoid any consequential damage.

It is one more object of the present invention to build a brake apparatus and a force-dispersing mechanism in a limited space.

This invention relates to an electronic device, e.g. a scanner, with a hinge to engage a cover. One end of the hinge connects the cover with a pivotal shaft, while another end of the hinge inserts into the body of the electronic device. Thereby, the cover can be mounted pivotally on the body, and the cover can be foldable with respect to the surface of the electronic device body. In the case that the electronic device is a scanner, the surface of the body should be a scanning surface. In addition, the electronic device comprises a brake apparatus for ensuring a lock-on open state of the cover so as to prevent the cover from impacting against the surface of the electronic device body. The force-dispersing mechanism is used to disperse the stress when the angle between the cover and the surface of the scanner exceeds a predetermined safety angle.

The brake apparatus comprises at least one interfering structure and at least one elastic interfering rib. The interfering structure is located on the surface of the cover. The elastic interfering rib shaped as a cantilever beam comprises a fixed end, a rib arm, and an interfering end opposite to the fixed end. The fixed end is located at the end of the hinge mounting the pivotal shaft. While the angle between the electronic device body surface and the cover exceeds the predetermined interfering angle, the interfering end can interfere with the corresponding interfering structure to avoid the cover to cover or hit back on the surface of the electronic device body.

The force-dispersing mechanism comprises an L-shaped brake, at least a hole, a cover plate, and a brake arm. The L-shaped brake is located on the lateral surface of the hinge. A first contact point and a second contact point are respectively located on two inside surfaces of the L-shaped brake. The hole is posited in the cover. The cover plate is used for covering the hole and interfering structure. The cover plate connects the cover by using a hook of the cover plate to lock at a corresponding hole. The first contact point and the second contact point can contact with the cover plate to disperse a pressure between the hinge and the cover, when the cover was lifted to a predetermined safety angle. At the same time, the cover plate can also be moved away the cover. Thereby, part of the pressure can be dispersed to the hook and the hole. Therefore, the pressure between the hinge and the cover can be reduced.

The brake arm is sited at one end of the hinge having the pivotal shaft, and is next to the elastic interfering rib. When the cover is lifted to the predetermined safety angle, the end of the brake arm can contact with the brake structure on the cover. Thereby, the brake structure can disperse the pressure of the hinge and the pressure of the cover as well.

Hence, the interfering structure and the elastic interfering rib of the brake apparatus in this invention can prevent the cover of the electronic device from thumping at the surface of the electronic device body. Also, the force-dispersing mechanism can disperse the pressure to prevent possible damage upon the hinge and the cover, when the angle between the cover and the electronic device body exceeds the predetermined safety angle. Furthermore, the brake apparatus and the force-dispersing mechanism can be mounted into a small space of the electronic device.

BRIEF DESCRIPTION OF THE APPENDED DRAWINGS

The advantages and spirit of the invention may be understood by the following recitations together with the appended drawings.

FIG. 1b is a side view of FIG. 1a.

FIG. 2b shows the hinge of FIG. 2a.

FIG. 4b is a perspective view of the preferred force-dispersing mechanism of FIG. 4a.

DETAILED DESCRIPTION OF THE INVENTION

Figure 1A:
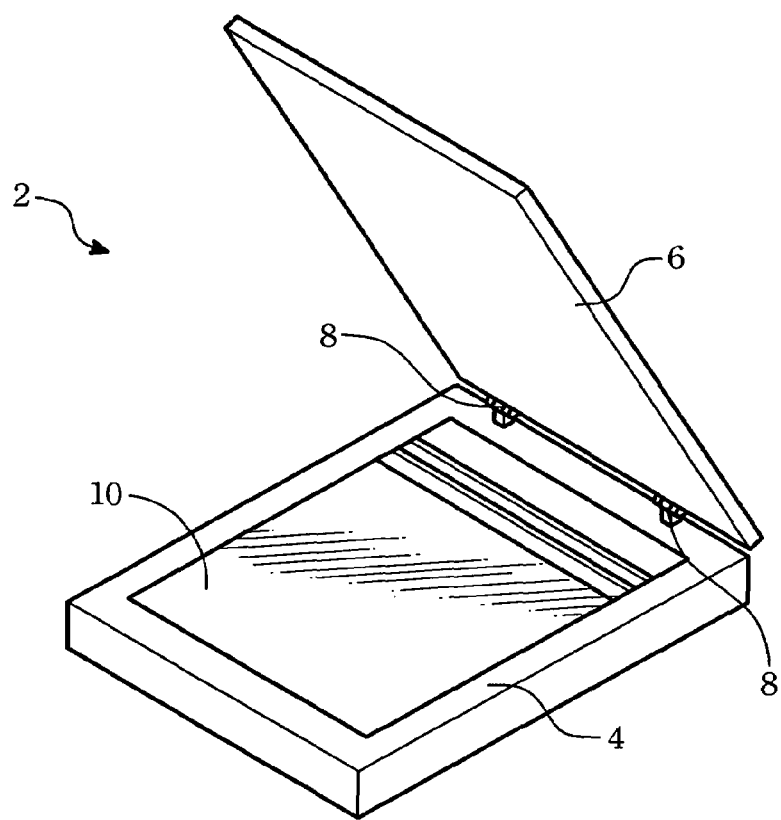
FIG. 1a shows a perspective view of a conventional scanner.
Figure 1B:
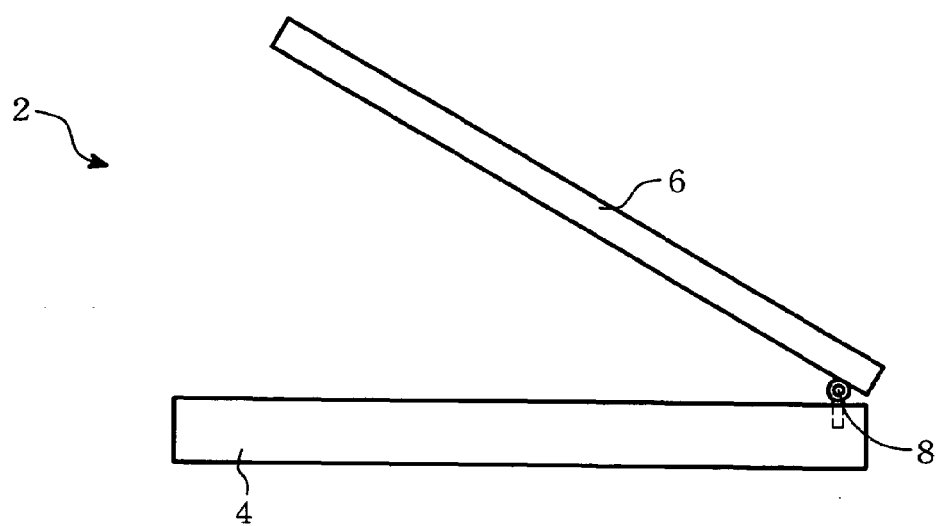
Figure 2A:
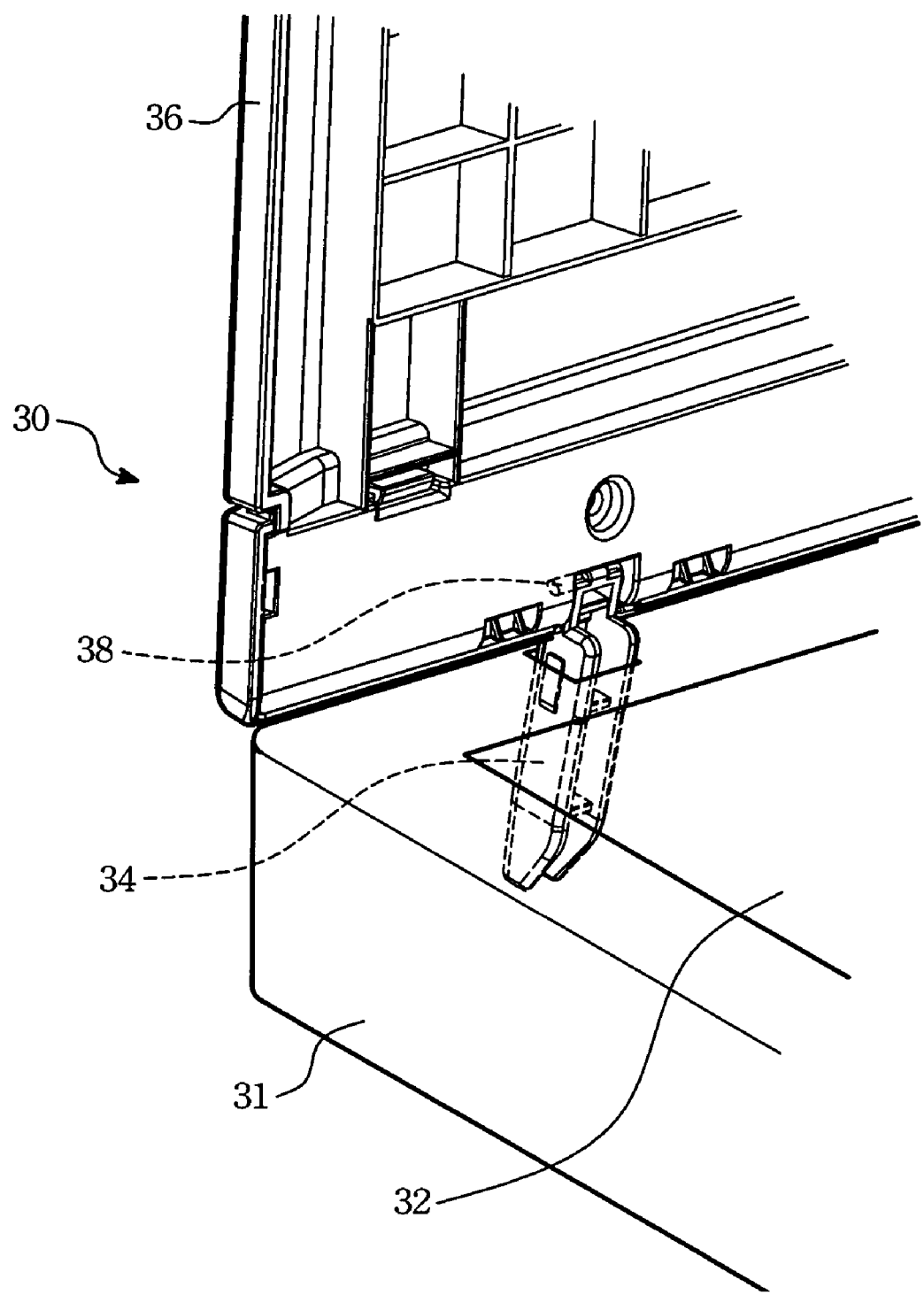
FIG. 2a is an enlarged perspective view of a preferred hinge, a preferred cover and an electronic device body according to this invention.

Referring to FIG. 2a (also FIG. 1 for reference), a preferred hinge 34, a preferred cover 36 and an electronic device body 31 according to this invention are shown. The hinge 34 is utilized to mount the cover 36 onto the electronic device body 31. As shown, one end of the hinge 34 is connected with the cover 36 through a pivotal shaft 38, while another end of the hinge 34 is inserted into the electronic device body 31. Under such an arrangement, the cover 36 can be lifted and folded with respect to the surface 32 of the body 31. In the present invention, the electronic device 30 can be a scanner, a Xerox machine, and the like. In the case that the electronic device 30 is a scanner, the surface 32 of the body 31 would be a scanning surface.

Figure 2B:
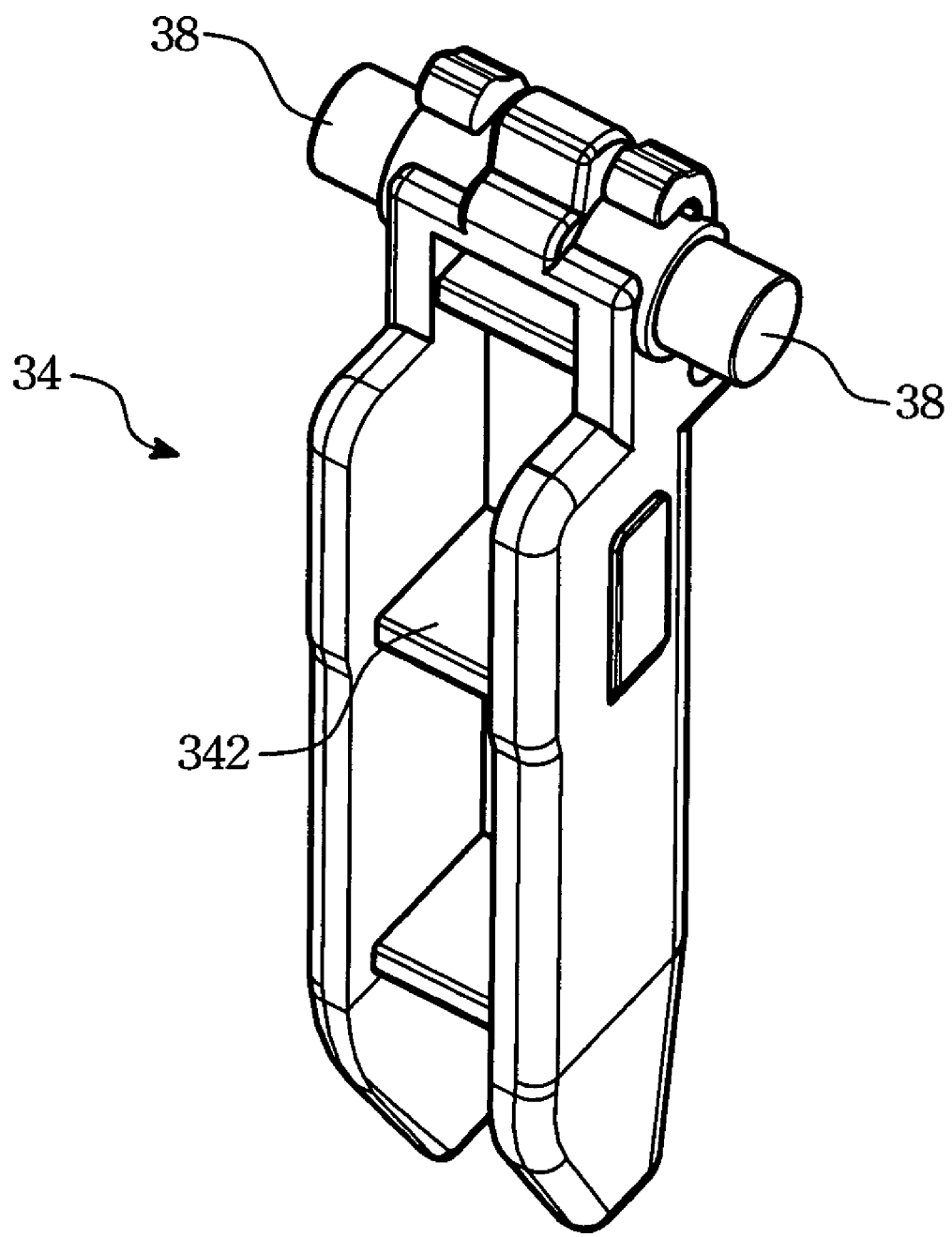

Referring to FIG. 2b, it shows the preferred hinge 34 according to the present invention. The pivotal shaft 38 of the hinge 34 is used to connect with the cover 36. As shown, the hinge 34 is preferred formed as a hollow rectangular pillar with one lateral side opened. The hollow hinges 34 with more than one reinforced rib 342 constructed inside the hinge 34 for consolidating and strengthening purposes.

Figure 3A:
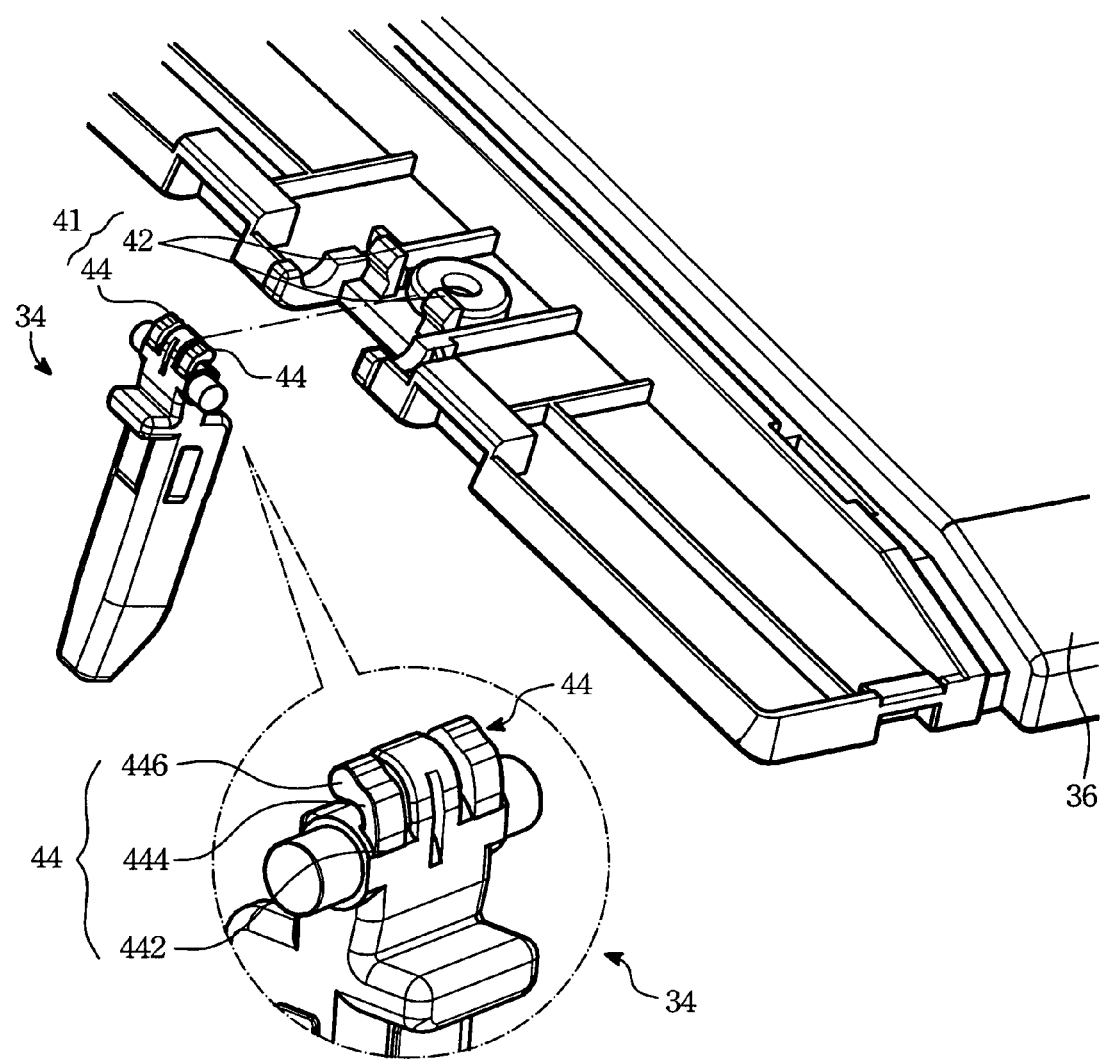
FIG. 3a shows a preferred embodiment of a brake apparatus according this invention.

Referring to FIG. 3a, a preferred brake apparatus 41 according to this invention is shown. The brake apparatus 41 is introduced to the electronic device 30 for forming an interference or a rotational stop to limit the rotation of the cover 36 with respect to the surface 32 of the electronic device body 31.

As shown, the brake apparatus 41 comprises at least one interfering structure 42 (two shown in the figure) and at least one elastic interfering rib 44 (two also shown in the figure). The interfering structure 42 is set up at an appropriate position of the cover 36 corresponding to the position of the elastic interfering rib 44 at the hinge 34. In order to have effective interference between the elastic interfering rib 44 and the interfering structure 42, surfaces for interference in the elastic interfering rib 44 and the interfering structure 42 should be designed by pairs. The purpose of such a design is to flexibly lock the cover 36 while it is lifted to a lock-on position (generally, 90 degree plus) with respect to the surface 32 of body 31.

The elastic interfering rib 44 shaped as a cantilever beam comprises a fixed end 442, a rib arm 444, and an interfering end 446. The fixed end 442 is mounted on the end of the hinge 34 which also mounts the pivotal shaft 38; i.e. the top end in the figure. The elastic interfering rib 44 extends toward the cover 36 by protruding the rib arm 444. The interfering end 446 is formed to be the free end of the rib arm 444. When the angle between the surface 32 and the cover 36 is within the predetermined interfering angle, the interfering end 446 can interfere with the interfering structure 42 to prevent the cover 36 from closing or dropping down on the surface 32 of the electronic device body 31.

Figure 3B:
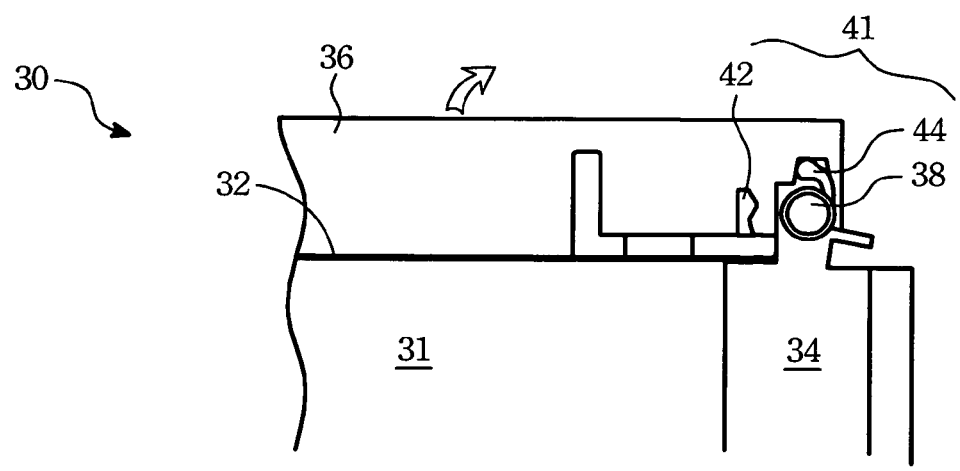
FIG. 3b is a side view of a portion of the preferred electronic device according to the present invention, in which the cover is at a close state with respect to the device body.
Figure 3C:
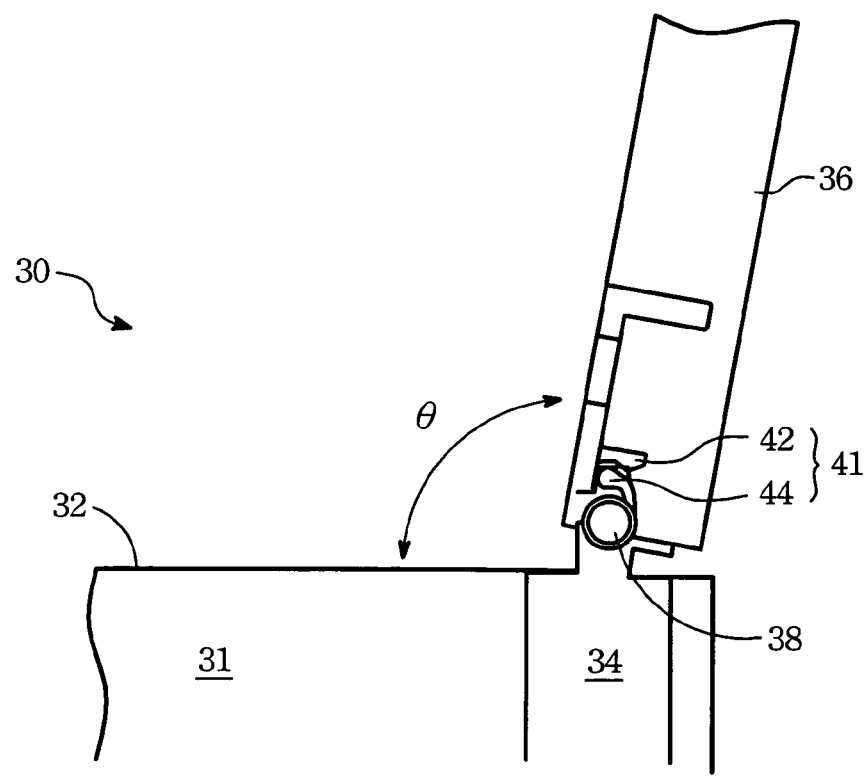
FIG. 3c is also a side view of the portion of the preferred electronic device of FIG. 3b, but with the cover at a lock-on state.
Figure 3D:
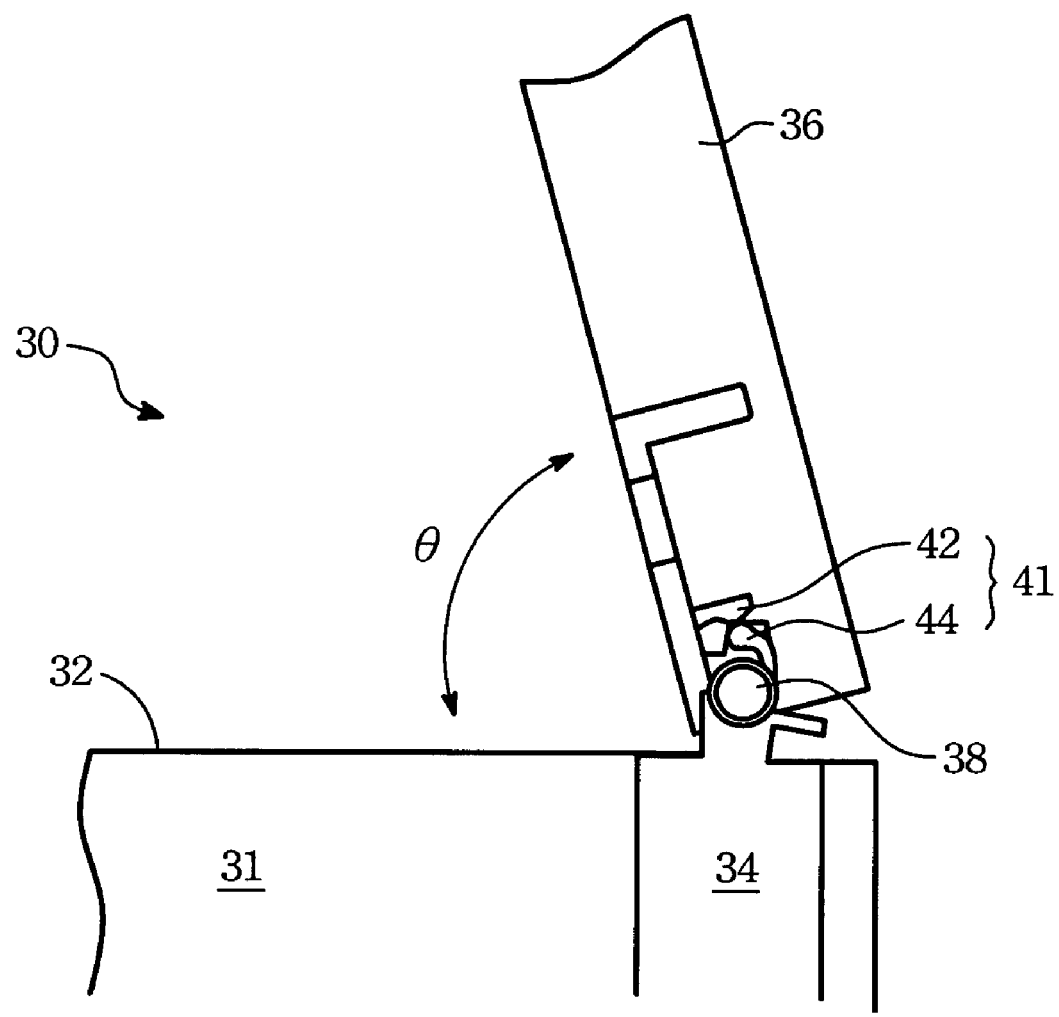
FIG. 3d is again a side view resembled FIG. 3b and FIG. 3c, but with the cover at a transition state.

Reference is now made to FIG. 3b, FIG. 3c, and FIG. 3d. FIG. 3b shows a side view of the electronic device 30 according to the present invention, in which the cover 36 is in a closed state and, in this state, the interfering structure 42 does not contact the elastic interfering rib 44. On the other hand, FIG. 3c and FIG. 3d show side views of the same electronic device 30 in two different open states; a lock-on state and a middle state, respectively. In FIG. 3d, the angle θ between the surface 32 and the cover 36 is less than 90 degrees, and, in this state, the interfering structure 42 is just in contact, but does not interfere with the elastic interfering rib 44. In the state shown in FIG. 3d, the cover 36 would impact against the surface 32 if the lifting force upon the cover 36 is removed. In FIG. 3c, the angle θ between the surface 32 and the cover 36 exceeds 90 degrees, and, in this state, the interfering structure 42 interferes with the elastic interfering rib 44 to freeze this open state. In the state shown in FIG. 3c, the cover 36 will stay even if the lifting force is removed.

In the present invention, the predetermined interfering angle that determines the lock-on state is decided by the designer of the electronic device 30, but anyhow it is preferably ranged from 70 degrees to 90 degrees. With such an arrangement of the brake apparatus 41, the cover 36 can then be avoided to accidentally turn back to the surface 32 while it is lifted to an angle greater than the predetermined interfering angle.

In the present invention, with the interfering structure 42 fixed, any design change in the length or thickness of the elastic interfering rib 44 or to the size of the interfering end 446 can result in a change in the predetermined interfering angle as well as the elasticity of the interfering rib 44. Therefore, by providing the brake apparatus 41 of the present invention, a designer of the electronic device 30 can have much room in determining the interfering angle between the cover 36 and the surface 32.

Figure 4A:
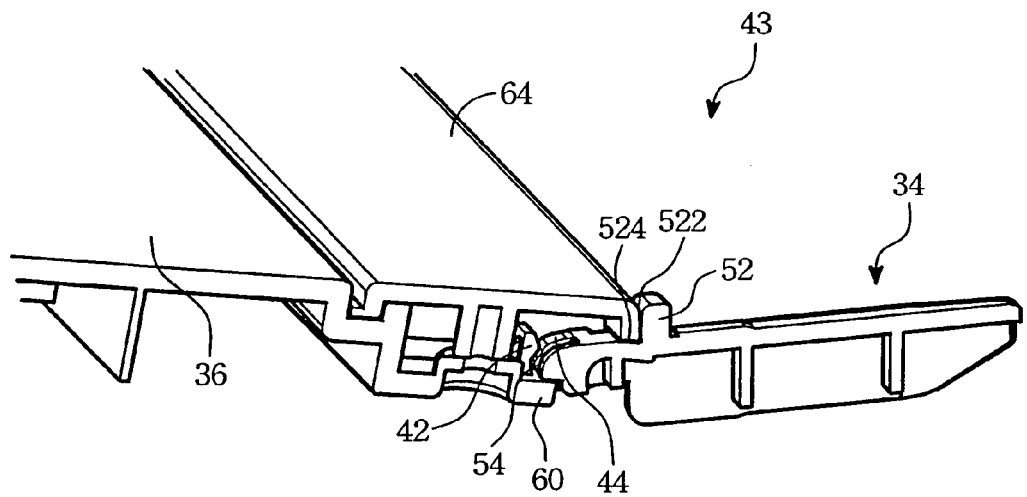
FIG. 4a is a perspective view of the preferred hinge and a preferred force-dispersing mechanism according to the present invention.
Figure 4B:
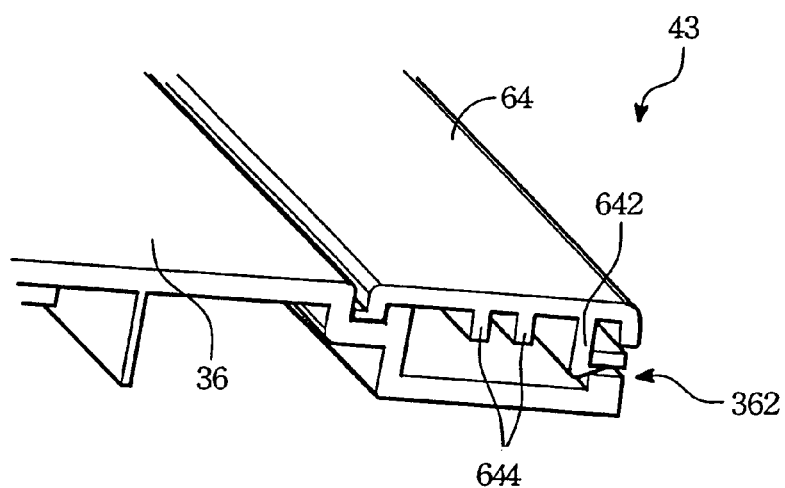
Figure 4C:
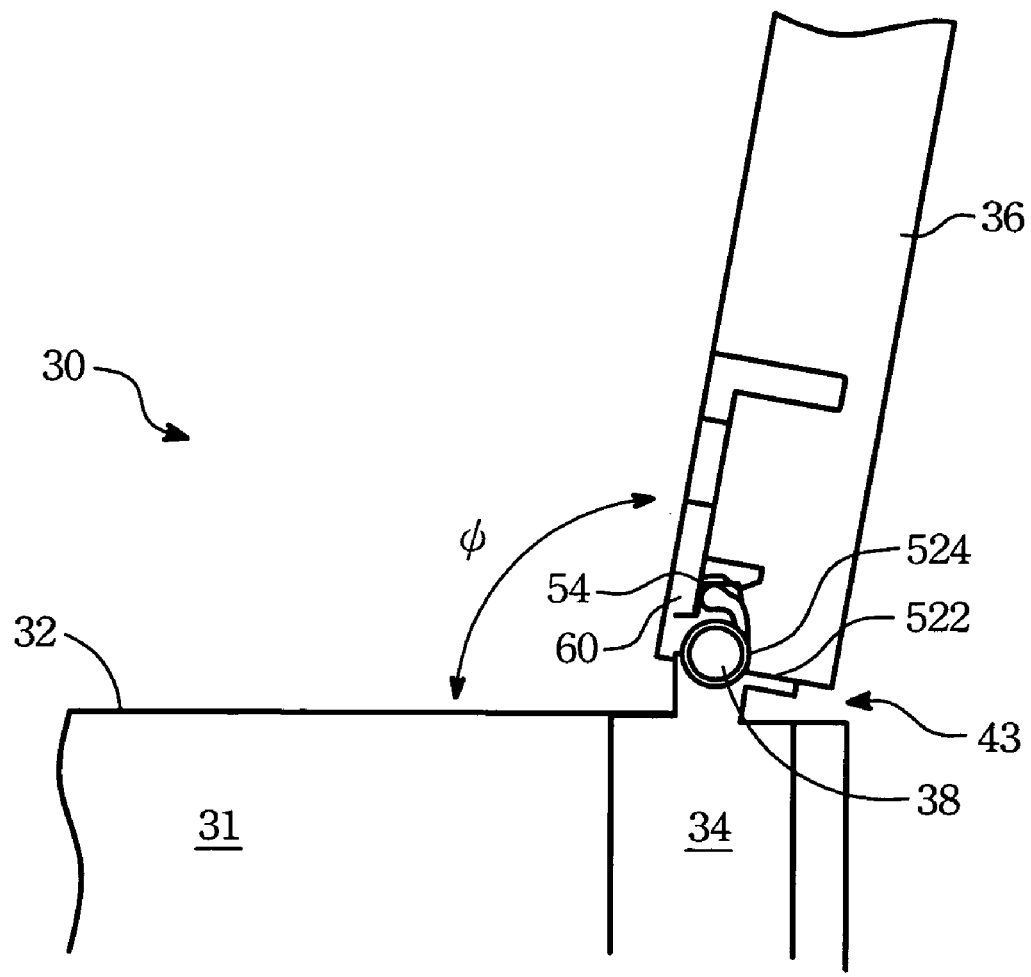
FIG. 4c shows a side view of the preferred force-dispersing mechanism of the invention applied to the electronic device.

In the present invention, the electronic device 30 can further comprise a force dispersing apparatus. Referring now to FIGS. 4a, 4b, and 4c, FIGS. 4a and 4b show two cross-sectional views of the force-dispersing mechanism 43 according to the present invention, and FIG. 4c shows a side view of the force-dispersing mechanism 43 according the present invention. Once the angle between the surface 32 of the electronic device body 31 and the cover 36 exceeds a predetermined safety angle larger than the predetermined interfering angle described above, the force-dispersing mechanism 43 can disperse the pressure upon the hinge 34 and the cover 36. The preferred predetermined safety angle can be 100 degree, for example.

The force-dispersing mechanism 43 comprises an L-shaped brake 52, a cover plate 64, an internal hook 642 located inside the cover plate 64, a brake arm 54, and a brake structure 60 corresponding to the brake arm 54. Referring to FIG. 4a, it shows one half part of force-dispersing mechanism 43. The L-shaped brake 52 is located at one side of hinge 34. A first contact point 522 and a second contact point 524 are located individually on the surface of the L-shaped brake 52 that faces the cover plate 64. When the cover 36 is lifted over the predetermined safety angle φ shown in FIG. 4c, the first contact point 522 and the second contact point 524 can contact the surface of the cover plate 64, and then disperse the stress resulted in the hinge 34 and the cover 36.

The brake arm 54 is located on the end of hinge 34 which also mounts the pivotal shaft 38. As shown, the brake arm 54 is placed next to the elastic interfering rib 44. When the cover 36 is lifted to the predetermined safety angle φ, one end of brake arm 54 can hit the brake structure 60 of the cover 36. Thereby, the force-dispersing mechanism 43 can disperse the force resulting in the hinge 34 and the cover 36.

Referring to FIG. 4b, another part of the force-dispersing mechanism 43 is shown. A slot 362 is constructed in the cover 36. The cover plate 64 covers the slot 362 and the interfering structure 42 (FIG. 4a), which the cover plate 64 can also protect and decorate the slot 362 for connecting the cover plate 64 and the cover 36.

Furthermore, at least one reinforced rib 644 is placed inside the cover plate 64 to act against lateral deformations of the cover plate 64. When the cover 36 is lifted to the predetermined safety angle φ, the first contact point 522 and the second contact point 524 of the L-shaped brake 52 can hit the surface of the cover plate 64. Subsequently a tension is produced between the cover plate 64 and the cover 36, and causes the cover plate 64 to move away from the cover 36. At the same time, the stress is dispersed between the hook 642 and the slot 362. Thereby, the hook 642 and the slot 362 disperse the force resulting in the hinge 34 and the cover 36.

Referring to FIG. 4c, the force-dispersing mechanism 43 in the electronic device 30 is shown. When the cover 36 is lifted and the angle between the surface 32 of the electronic device body 31 and the cover 36 reaches the predetermined safety angle φ more than the predetermined interfering angle, the cover 36 can be stopped to prevent any further movement. In the present invention, the preferred predetermined safety angle φ can be set to any proper angle larger than the predetermined interfering angle, say 100 degrees if the predetermined interfering angle is 90 degrees. At the same time, the stress produced at those contact points mentioned above, such as the first contact point 522, the second contact point 524, the contact points of the brake arm 54, the brake structure 60, and the cover plate 64 can be dispersed to the hooks 642 and the slots 362. Thereby, the force-dispersing mechanism 43 can disperse the force resulting in the hinge 34 and the cover 36 effectively, and prevent damage to the hinge 34 and the cover 36.

As a result of the dispersing method mentioned above, the hinge 34, the cover 36, and related components on the hinge 34 can be made of plastic material. Thereby, the hinge 34 and the cover 36 can be produced easier and at a lower cost.

Hence, the interfering structure 42 and elastic interfering rib 44 of the brake apparatus 41 in this invention can prevent the cover 36 of electronic device 30 from covering or colliding with the surface 32 of the electronic device body 31 in a sudden movement, when the cover 36 is lifted to the predetermined interfering angle θ. Also, the force-dispersing mechanism 43 can disperse the pressure for preventing possible damage of the hinge 34 and the cover 36, when the angle between the cover 36 and the surface 32 of the electronic device body 31 exceeds the predetermined safety angle φ. Furthermore, the brake apparatus 41 and the force-dispersing mechanism 43 can be disposed in a small space inside the electronic device 30.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An electronic device, comprising
   an electronic device body;
   a cover;
   a hinge, coupling the cover at one end thereof with a pivotal shaft, and coupling the electronic device body with the other end thereof by inserting into the electronic device body;
   a brake apparatus between the hinge and the cover and, comprising at least one interfering structure and at least one elastic interfering rib, the interfering structure being located at a surface of the cover, the elastic interfering rib being shaped as a cantilever beam having a fixed end, and an interfering end opposite the fixed end, the fixed end being mounted at the end of the hinge having the pivotal shaft, and when an angle between the electronic device body and the cover exceeds a predetermined interfering angle, the interfering end interferes with the corresponding interfering structure for preventing the cover to impact on the electronic device body; and
   a force-dispersing mechanism between the hinge and the cover and, comprising an L-shaped brake, a cover plate, and a brake arm, the L-shaped brake being located at one side of the hinge, a first contact point and a second contact point being located respectively on a surface of the L-shaped brake facing the cover, at least one slot positioned in the cover, the cover plate covering the slot, a hook located on an inside surface of the cover plate for locking in the corresponding slot to further connect the cover plate and the cover, when the cover is lifted to the predetermined interfering angle, the first contact point and the second contact point contact the surface of the cover plate to disperse a stress resulting in the hinge and the cover, when the first contact point and the second contact point contact the cover plate, the hook then engaging in the slot for dispersing stress between the cover plate and the cover, and the hinge disperses further stress between the hinge and the cover, the brake arm being located on the end of the hinge mounting the pivotal shaft, the brake arm contacting the cover so as to disperse a force resulting in the hinge and the cover when the cover is lifted to the predetermined safety angle.

2. The electronic device according to claim 1, wherein the electronic device is a scanner and the surface of the body is a scanning surface.

3. The electronic device according to claim 1, wherein a range of the interfering angle is from 70 degrees to 90 degrees, and the predetermined safety angle is 100 degrees.

4. The electronic device according to claim 1, further including at least one reinforced rib located on an inside surface of the cover plate to resist deformation thereof.

5. The electronic device according to claim 1, wherein the hinge comprises a hollow rectangular pillar with one lateral side opened and has at least one reinforced rib positioned inside the hinge and connecting with three other lateral sides of the hinge.

6. The electronic device according to claim 1, wherein the hinge and the cover are made of plastic.

7. The electronic device according to claim 1, further including a brake structure located on the cover for contacting the brake arm so as to disperse a force resulting in the hinge and the cover.

8. An electronic device, comprising
an electronic device body
a cover;
a hinge, coupling the cover at one end thereof with a pivotal shaft, and coupling the electronic device body with the other end thereof by inserting into the electronic device body;
a force-dispersing mechanism having an L-shaped brake located at one side of the hinge, a first contact point and a second contact point being located respectively on a surface of the L-shaped brake facing the cover, the first contact point and the second contact point contacting the cover when the cover is lifted to a predetermined safety angle larger than the predetermined interfering angle; and
a brake apparatus, comprising at least one interfering structure and at least one elastic interfering rib, the interfering structure being located at a surface of the cover, the elastic interfering rib being shaped as a cantilever beam having a fixed end, and an interfering end opposite the fixed end, the fixed end being mounted at the end of the hinge having the pivotal shaft;
wherein, when an angle between the electronic device body and the cover exceeds a predetermined interfering angle, the interfering end on the elastic interfering rib interferes with the corresponding interfering structure for preventing the cover to impact on the electronic device body.

9. The electronic device according to claim 8, wherein the electronic device is a scanner and the surface of the body is a scanning surface.

10. The electronic device according to claim 8, wherein the hinge comprises a hollow rectangular pillar with one lateral side opened and at least one reinforced rib positioned inside the hinge and connecting with three other lateral sides of the hinge.

11. The electronic device according to claim 8, wherein a range of the interfering angle is from 70 degrees to 90 degrees, and the predetermined safety angle is 100 degrees.

12. The electronic device according to claim 8, wherein said interfering end of said elastic interfering rib of cantilever shape is positioned on the hinge for being pressed against by said interfering structure at said interfering angle.

13. The electronic device according to claim 8, wherein the force dispersing mechanism further comprises a brake arm located on the end of the hinge mounting the pivotal shaft, the brake arm contacting the cover so as to disperse a force resulting in the hinge and the cover when the cover is lifted to the predetermined safety angle.

14. The electronic device according to claim 13, further including a brake structure located on the cover for contacting the brake arm so as to disperse a force resulting in the hinge and the cover.

15. The electronic device according to claim 8, wherein the force dispersing mechanism further comprises:
at least one slot positioned in the cover; and
a cover plate covering the slot, having thereof a hook located on an inside surface of the cover plate for engaging in and locking the corresponding slot to further connect the cover plate and the cover;
wherein, when the cover is lifted to the predetermined interfering angle, the first contact point and the second contact point contact the surface of the cover plate to disperse a stress resulting in the hinge and the cover; and
wherein, when the first contact point and the second contact point contact the cover plate, the hook engages in the slot for dispersing tension between the cover plate and the cover disperses another stress resulting in the hinge and the cover.

16. The electronic device according to claim 15, further including at least one reinforced rib located on an inside surface of the cover plate to act against possible deformation.

17. The electronic device according to claim 16, wherein the hinge and the cover are made of plastic.

* * * * *